United States Patent
Kimura et al.

(10) Patent No.: US 9,453,980 B2
(45) Date of Patent: Sep. 27, 2016

(54) OPTICAL FIBER CABLE

(71) Applicant: Mitsubishi Rayon Co., Ltd., Tokyo (JP)

(72) Inventors: Tsuyoshi Kimura, Toyama (JP); Yoshihiro Tsukamoto, Toyama (JP); Kouji Asano, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/778,658

(22) PCT Filed: Mar. 20, 2014

(86) PCT No.: PCT/JP2014/057789
§ 371 (c)(1),
(2) Date: Sep. 21, 2015

(87) PCT Pub. No.: WO2014/148610
PCT Pub. Date: Sep. 25, 2014

(65) Prior Publication Data
US 2016/0054532 A1    Feb. 25, 2016

(30) Foreign Application Priority Data

Mar. 22, 2013 (JP) ................. 2013-059306

(51) Int. Cl.
| | |
|---|---|
| *G02B 6/44* | (2006.01) |
| *C03C 25/10* | (2006.01) |
| *C08K 3/32* | (2006.01) |
| *C08L 23/04* | (2006.01) |
| *C08L 23/10* | (2006.01) |
| *G02B 6/02* | (2006.01) |
| *C03C 25/30* | (2006.01) |

(52) U.S. Cl.
CPC ........... *G02B 6/4436* (2013.01); *C03C 25/106* (2013.01); *C03C 25/1065* (2013.01); *C03C 25/30* (2013.01); *C08K 3/32* (2013.01); *C08L 23/04* (2013.01); *C08L 23/10* (2013.01); *G02B 6/02033* (2013.01); *G02B 6/4402* (2013.01); *G02B 6/4433* (2013.01)

(58) Field of Classification Search
CPC  G02B 6/4436; G02B 6/4433; C03C 25/106; C03C 25/30
USPC .......................... 385/123, 141, 144
See application file for complete search history.

(56) References Cited

U.S. PATENT DOCUMENTS

| | | | | |
|---|---|---|---|---|
| 5,444,809 A | * | 8/1995 | Aoki | .................. C09K 21/12 |
| | | | | 252/609 |
| 2006/0088263 A1 | * | 4/2006 | Tanaka | ............... C03C 25/1065 |
| | | | | 385/128 |

FOREIGN PATENT DOCUMENTS

| | | | | |
|---|---|---|---|---|
| JP | 62-165611 A | | 7/1987 | |
| JP | 02-257105 A | | 10/1990 | |
| JP | 03-100610 A | | 4/1991 | |
| JP | 07-077641 A | | 3/1995 | |
| JP | 07-294785 A | | 11/1995 | |
| JP | 2002-12771 A | | 1/2002 | |
| JP | 2004-219815 A | | 8/2004 | |
| JP | 2004-264369 A | | 9/2004 | |
| JP | 2008-197302 A | | 8/2008 | |
| JP | 2009-263533 A | | 11/2009 | |
| JP | 2009263533 A | * | 11/2009 | ............. C08F 20/16 |
| WO | 2012/173190 A1 | | 12/2012 | |

OTHER PUBLICATIONS

International Search Report issued in corresponding International Patent Application No. PCT/JP2014/057789 dated Jun. 10, 2014.

* cited by examiner

*Primary Examiner* — Ryan Lepisto
(74) *Attorney, Agent, or Firm* — Morgan, Lewis & Bockius LLP

(57) ABSTRACT

An optical fiber cable is formed with an optical fiber and a coating layer made up of at least one layer provided on the outer periphery of the optical fiber. The material for forming the coating layer is made of a halogen-free resin composition containing polyolefin resin (A) and melt tension enhancer (B).

12 Claims, No Drawings

OPTICAL FIBER CABLE

FIELD OF THE INVENTION

The present invention relates to an optical fiber cable.

BACKGROUND ART

Optical fibers are used for data transmission and sensor applications; types of optical fibers are optical glass fibers made of glass such as silica, and plastic optical fibers made of plastics (hereinafter referred to as "POF").

POFs are structured mainly to have a core made of highly transparent resin such as polymethyl methacrylate and, around the core, a resin with a refractive index lower than that of the resin of the core. Compared with glass optical fibers, the transmission distance of POFs is shorter, but POFs have advantages such as easier handling, simplified formation of connectors, lightweight and inexpensive material, and diameters that can be set greater. Thus, POFs are used in diversified applications such as illumination, sensors and communication systems, and the production of POFs is on the rise.

When optical fibers are used, it is rare to use them alone, except for illumination purposes. Generally, optical fibers are coated with resins to form optical fiber cables so that properties such as mechanical strength, heat resistance and flame retardancy are provided for the cables.

Regulations on flame retardant plastics have become stricter recently. When a POF is used in plenum spaces such as in a building or condominium, high flame retardancy properties are also required for the POF. To satisfy such a requirement, various types of optical fiber cables have been proposed.

For example, Patent Publication 1 describes that when a halogen-free phosphoric ester-based flame retardant and a hindered amine-based stabilizer are added to a polypropylene resin, an optical fiber cable is obtained which exhibits flame retardancy to a degree that passes flame testing specified in DIN 72551-5.

Patent Publications 2 and 3 disclose that flame retardancy properties are provided for POF cables by using a chlorinated polyethylene resin and a vinyl chloride resin (or a composition containing a vinyl chloride resin) respectively as the resin to coat the POF.

Patent Publications 4 and 5 disclose that flame retardancy properties are provided for POF cables by using a coating material prepared by adding a flame retardant such as metal hydroxide to a polyethylene resin.

In addition, Patent Publication 6 describes a fiber optic cord formed by coating a polymer alloy containing polyphenylene ether on an optical fiber formed using silica glass as a main component.

PRIOR ART PUBLICATION

Patent Publication

Patent publication 1: JP2004-219815A
Patent publication 2: JP H03-100610A
Patent publication 3: JP H07-294785A
Patent publication 4: JP S62-165611A
Patent publication 5: JP H02-257105A
Patent publication 6: JP2008-197302A

SUMMARY OF THE INVENTION

Problems to be Solved by the Invention

However, when the cable described in Patent Publication 1 is used, it is hard to achieve flame retardancy to a degree that passes vertical flame testing, a so-called VW-1 test specified in UL Standards (Underwriters Laboratories Inc.), which requires a high level of self-extinguishing capability and anti-dripping characteristics.

The resins to form a coating material described in Patent Publications 2 and 3 contain halogen. Thus, when the POF is burned, resultant dioxins or the like cause concern about environmental contamination and negative impact on the human body. Accordingly, regulations on such POF cables are becoming stricter, and POF cables are restricted from being used indoors or in moving vehicles such as railways and automobiles.

The resins for forming coating materials described in Patent Publications 4 and 5 contain a large amount of a highly flame-retardant metal hydroxide. Thus, POF cables containing such resins in coating layers do not have the initially intended lightweight features, and their mechanical strength as a cable is low.

Patent Publication 6 describes coating material that does not contain halogen. Unlike a glass optical fiber, a plastic optical fiber (POF) tends to be affected when components of additives such as a flame retardant in the coating layer migrate into the POF. Thus, when the coating material described in Patent Publication 6 is used as is for a POF, the components of additives in the coating material may migrate into the POF, and light transmission efficiency may be negatively affected.

Accordingly, the objective of the present invention is to provide an optical fiber cable that exhibits excellent flame retardancy and contributes to sufficiently suppressing an increase in transmission loss.

Solutions to the Problems

The inventors of the present invention have conducted intensive studies and found that the above objective is achieved by using coating materials prepared by combining specific materials, and have completed the present invention accordingly.

One aspect of the present invention is an optical fiber cable having optical fiber and a coating layer which is provided on the outer periphery of the optical fiber and is made up of at least one layer. In such an optical fiber cable, the material for forming the coating layer is made of a halogen-free resin composition that contains polyolefin resin (A) and melt tension enhancer (B).

Effects of the Invention

The optical fiber cable according to an embodiment of the present invention exhibits excellent flame retardancy without using a halogen-containing flame retardant or resin, and contributes to sufficiently suppressing an increase in transmission loss.

DETAILED DESCRIPTION OF THE EMBODIMENTS

An optical fiber cable according to an embodiment of the present invention has optical fiber and a coating layer made of at least one layer provided on the outer periphery of the optical fiber. The material for forming the coating layer is made of a halogen-free resin composition containing polyolefin resin (A) and melt tension enhancer (B).

The coating layer above may be single-layered or multi-layered with two or more laminated layers. When the coating layer is multilayered, it is preferred to have an inner coating layer positioned on the inner side of the coating layer and formed with a halogen-free resin composition that contains polyolefin resin (A) and melt tension enhancer (B). In such a structure, the coating layer is preferred to have an outer coating layer positioned on the outer side of the inner coating layer and formed with a composition that contains polyphenylene ether resin.

Polyolefin resin (A) is preferred to be at least one resin material selected from polyethylene, polypropylene, ethylene-alkylacrylate copolymers and ethylene-vinyl alcohol copolymers.

Melt tension enhancer (B) is preferred to be made of acrylic resin. The weight-average molecular weight of the acrylic resin is preferred to be 1,000,000 to 6,000,000.

The material for forming the coating layer (when the coating layer is multilayered, preferably the material for forming the inner coating layer) is preferred to contain polyolefin resin (A) at 70~99 mass % and melt tension enhancer (B) at 1~30 mass % based on the total mass of the polyolefin resin (A) and melt tension enhancer (B).

The material for forming the coating layer (when the coating layer is multilayered, at least the material for forming the outer coating layer) is preferred to contain halogen-free flame retardant (C). Halogen-free flame retardant (C) is preferred to be made of at least one material selected from metal hydroxide (C1) and phosphorus compound (C2). It is more preferable if phosphorus compound (C2) is made of at least one compound selected from red phosphorus, phosphoric ester compounds, condensed phosphoric ester compounds, phosphate compounds, condensed phosphate compounds, phosphoric amide compounds, and condensed phosphoric amide compounds. Such material for forming a coating layer is preferred to contain polyolefin resin (A) at 39~94 mass %, melt tension enhancer (B) at 1~30 mass % and halogen-free flame retardant (C) at 5~60 mass %, based on the total mass of the polyolefin resin (A), melt tension enhancer (B) and halogen-free flame retardant (C).

The polyphenylene ether resin is preferred to be an alloy resin of polyphenylene ether and polystyrene. It is more preferable for the polystyrene to be a styrene elastomer. The polyphenylene ether resin is preferred to be an alloy resin that contains polyphenylene ether at 50~80 mass %.

The optical fiber cable according to an embodiment of the present invention exhibits excellent flame retardancy without using a halogen-containing flame retardant or resin, and contributes to sufficiently suppressing an increase in transmission loss. In addition, the optical fiber cable according to another embodiment of the present invention exhibits excellent flame retardancy and mechanical characteristics, and contributes to sufficiently suppressing an increase in transmission loss.

In the following, optical fiber cables according to an embodiment of the present invention are described in detail.

(1) Optical Fiber

The type of optical fiber to be used in the optical fiber cables of the embodiments of the present invention is not limited specifically. For example, glass optical fibers may be used, or plastic optical fibers (POFs) may also be used. However, considering ease of handling, POFs are preferred to be used in the optical fiber cables according to the embodiments of the present invention.

The type of glass optical fiber is not limited specifically. For example, any known optical fibers such as follows may be used: a quartz glass fiber, where the core and cladding are both made of quartz glass; and a polymer-clad silica fiber (PCS), where the core is made of quartz glass and the cladding is made of fluorocarbon resin.

The type of POF is not limited specifically, either. Any known or newly developed POF may be used. Examples of a POF are a GI type POF, where the refractive index of the core is continuously lowered from the center toward the periphery; a multilayer POF, where the refractive index of the core is intermittently lowered from the center toward the periphery; a multi-core POF, where multiple cores are surrounded by cladding to be integrated; and the like. Among those, multilayer POFs are preferred, because such POFs are set to have a broader bandwidth and are capable of performing high-speed signal transmission.

(1-1) Core

The material for a core (core material) is not limited specifically, and may be selected properly according to usage purposes. For example, a highly transparent polymer may be used as the core material of a POF.

Preferred examples of a highly transparent polymer are polymers containing methacrylate units as follows: methyl methacrylate homopolymers; copolymers containing a methyl methacrylate unit as their main constitutional unit; and polymers containing a fluorinated alkyl methacrylate unit as their main constitutional unit.

Among them, methyl methacrylate homopolymers and copolymers containing a methyl methacrylate unit as their main constitutional unit are preferred. As for copolymers, they are preferred to contain methyl methacrylate units at 50 mass % or greater, more preferably 60 mass % or greater, even more preferably 70 mass % or greater. Methyl methacrylate homopolymers are especially preferred because of their excellent heat resistance and transparency properties.

(1-2) Cladding

Cladding formed around the outer periphery of a core may be single-layered or multilayered with two or more layers. The material (sheath material) for POF cladding is selected from those having a lower refractive index than that of the core material.

When a methyl methacrylate homopolymer or a copolymer containing a methyl methacrylate unit as its main constitutional unit is used as a core material, preferred examples of sheath material are fluorine polymers such as vinylidene fluoride polymers, perfluoroalkyl methacrylate polymers, methacrylate polymers, copolymers of a perfluoroalkyl methacrylate compound and a (meth)acrylate compound, and the like.

Examples of vinylidene fluoride polymers are polyvinylidene fluorides and copolymers containing vinylidene fluoride units; for example, vinylidene fluoride-tetrafluoroethylene copolymers, vinylidene fluoride-hexafluoropropylene copolymers, vinylidene fluoride-hexafluoroacetone copolymers, vinylidene fluoride-tetrafluoroethylene-hexafluoropropylene copolymers, vinylidene fluoride-trifluoroethylene copolymers, and the like.

(1-3) POF

POFs structured with the aforementioned cores and cladding may be manufactured by conventional methods such as a melt spinning method. For manufacturing optical fiber cables to be used under conditions of a wide temperature range, it is preferred to conduct continuous or batch annealing treatments to suppress pistoning.

The diameter of a POF in the embodiments of the present invention is not limited specifically, and may be selected according to usage purposes or the like. For example, the diameter is preferred to be 500 μm~1200 μm, more preferably 700 μm~1100 μm, even more preferably 750 μm~1000 μm, when transmission characteristics and ease of handling are considered.

The thickness of POF cladding is preferred to be 3~30 µm, more preferably 4~20 µm, even more preferably 5~15 µm, to achieve total reflection of the light propagating through the core. When the thickness of cladding is set at 3 µm or greater, it is easier to achieve total reflection of light that propagates through the core. When the thickness of cladding is 30 µm or less, a decrease in the amount of light that propagates through the POF is prevented, since the diameter of the core at such a setting will not be restricted to a certain size corresponding to the thickness of the cladding. However, even if the thickness of the cladding is increased beyond 30 µm, hardly any significant improvement is observed in the effects on the propagation of light.

(2) Optical Fiber Cable

An optical fiber cable according to an embodiment of the present invention is provided with the aforementioned optical fiber and a coating layer to cover the optical fiber.

The coating layer may be single-layered, or multilayered formed with two or more layers. When it is a multilayered coating layer, it includes at least two layers—a layer formed on the inner side closer to the optical fiber (inner coating layer), and another layer formed outside the inner layer (outer coating layer). Other layers in addition to the two layers may be provided at any positions, such as between the optical fiber and the inner coating layer, between the inner coating layer and the outer coating layer, and on the outer periphery of the outer coating layer.

(2-1) Coating Layer/Inner Coating Layer (2-1-1) Polyolefin Resin (A)

In an embodiment of the present invention, the coating layer (inner coating layer when the coating layer is multi-layered) is made of a composition containing polyolefin resin (A) as its main component. Polyolefin (A) as a main component indicates that the material (composition) for the coating layer or the inner coating layer contains polyolefin resin (A) at 50 mass % or more.

The type of olefin to form polyolefin resin (A) used in the present embodiment is not limited specifically. It may be a linear olefin or a branched olefin. Preferred compounds of olefin are, for example, alkenes having 2~6 carbon atoms. Linear alkenes or branched alkenes may be used.

In particular, examples are ethylene, propylene, 1-butene, 2-butene, isobutene, 1-pentene, cis-2-pentene, trans-2-pentene, hex-1-ene, hex-2-ene, hex-3-ene and the like.

Examples of polyolefin resin (A) are polymers obtained by homopolymerizing α-olefin such as ethylene and propylene (for example, low-density polyethylene (LDPE), high-density polyethylene (HDPE), polypropylene (PP) and the like); copolymers of ethylene and other α-olefins (for example, linear low-density polyethylene (LLDPE) and the like); and copolymers of ethylene and other copolymerizable monomer units.

Examples of a copolymer of ethylene and other copolymerizable monomer units are copolymers of ethylene and (meth)acrylate compounds (for example, ethylene-ethyl acrylate (EEA) copolymers and the like), ethylene-vinyl acetate (EVA) copolymers, ethylene-vinyl alcohol (EVOH) copolymers and the like.

Polyolefin resin (A) is preferred to be at least one resin material selected from the following: polyethylene, polypropylene, ethylene-alkyl acrylate copolymers, and ethylene-vinyl alcohol copolymers.

Among the polyolefin resins listed above, polyethylene and polypropylene such as LDPE, HDPE and LLDPE are preferred, polyethylene is more preferred, and LDPE and LLDPE are even more preferred, because they are inexpensive and easier to obtain for industrial applications.

When the coating layer is multilayered that includes an inner-coating layer and an outer-coating layer, and when a modified polyphenylene ether resin is used for the outer coating layer, copolymers of ethylene and other copolymerizable monomer units, for example, ethylene-alkyl acrylate copolymers such as EEA and ethylene-vinyl alcohol (EVOH) copolymers, are preferred from the viewpoint of achieving adhesiveness with the modified polyphenylene ether.

In an embodiment of the present invention, polyolefin resin (A) is used as the main component of the material for forming the coating layer (or the inner coating layer). Accordingly, excellent mechanical characteristics as well as excellent chemical resistance properties are provided for the optical fiber cable, thereby enabling the optical fiber cable to be used in various fields such as industrial applications and wiring in devices. When the coating layer is multilayered, polyolefin resin (A) contributes to preventing components such as a flame retardant contained in the outer coating layer from migrating into the optical fiber cable, and to reducing the negative impact on optical fiber, especially on optical properties of POFs (mainly on transmission loss).

(2-1-2) Melt Tension Enhancer (B)

Melt tension enhancer (B) is added to the coating layer (or the inner coating layer) of an optical fiber cable according to an embodiment of the present invention so as to provide melt tension for polyolefin resin (A) as the main component. By adding a melt tension enhancer, polyolefin resin (A) exhibits increased melt tension during combustion, and is suppressed from dripping.

Examples of melt tension enhancer (B) are not limited specifically as long as they can be mixed well with polyolefin resin (A) and increase the melt tension of the resin. It is preferred to use high-molecular weight resins capable of forming pseudo-crosslinking with polyolefin resin (A). Here, high-molecular weight resins indicate those having a weight-average molecular weight of 1,000,000 or greater. The weight-average molecular weight of melt tension enhancer (B) is preferred to be 1,000,000~6,000,000. Having a molecular weight of 6,000,000 or less enhances processability of coating layers and mechanical characteristics of cables. Weight-average molecular weights are measured by gel permeation chromatography (GPC) (standard polystyrene is used as the standard sample).

Acrylic resins may be used as melt tension enhancer (B). A specific example of melt tension enhancer (B) using acrylic resin is the METABLEN P series made by Mitsubishi Rayon Co., Ltd. Acrylic resin is especially preferred as melt tension enhancer (B), since the melt tension of polyolefin resin (A) is more greatly improved.

The amount of melt tension enhancer (B) contained in the coating layer is preferred to be 1~30 mass %, more preferably 2~25 mass %, even more preferably 3~20 mass %, in the material for forming the coating layer (when the coating layer is single-layered, to be contained in the single layer; when the coating layer is multilayered, to be contained in the inner coating layer). By setting the content as 1 mass % or greater, even higher melt tension is provided for polyolefin resin (A). However, if the content is set greater than 30 mass %, hardly any significant increase in the effects is observed.

(2-1-3) Additives to Inner Coating Layer (Black Pigment, Flame Retardant, etc.)

When the coating layer of an optical fiber cable is multilayered, various additives may be provided for the inner coating layer to improve the performance of the optical fiber cable. For example, to provide functions such as preventing light from leaking from the optical fiber to the coating layer and incident light from entering the optical fiber and the like, light-shielding materials such as carbon black and black pigment may be added to the inner coating layer.

The type and content of additives are not limited specifically, and may be selected properly according to usage purposes of the optical fiber cable or the like. The content of an additive may be selected based on the type. For example, when a light-shielding material such as black pigment is used as an additive, the content is preferred to be 0.15~5 mass %, more preferably 0.2~2.5 mass %, even more preferably 0.3~1.5 mass %, of the material (composition) for forming the inner coating layer. By setting the content at 0.15 mass % or greater, even better effects of suppressing external light from entering the optical fiber are achieved. By setting the content at 5 mass % or less, the effects of shielding light are achieved without decreasing the primary objective of using optical fiber, namely, transmission stability. Also, by setting the content at 5 mass % or less, even when the optical fiber is bent when installed, light leakage from the bent portion is prevented.

In addition, to enhance flame retardancy properties, the inner coating layer may be provided with a flame retardant as follows: metal hydroxides such as magnesium hydroxide and aluminum hydroxide; phosphorus compounds such as red phosphorus and organophosphorus compounds; and nitrogen compounds such as melamine cyanurate.

The content of a flame retardant in the inner coating layer is not limited specifically as long as it does not impair the desired properties specified in the embodiments of the present invention. For example, when a metal hydroxide is used as a flame retardant, its content is preferred to be 1550 mass %, more preferably 2048 mass %, even more preferably 2045 mass %, of the material (composition) for forming the inner coating layer; when a phosphorus compound is used as a flame retardant, its content is preferred to be 1~10 mass %, more preferably 2~8 mass %, even more preferably 3~7 mass %, of the material (composition) for forming the inner coating layer; when a nitrogen-based flame retardant is used, its content is preferred to be 10~50 mass %, more preferably 15~45 mass %, even more preferably 20~40 mass %, of the material (composition) for forming the inner coating layer.

Those flame retardants listed above may be used alone or in combination thereof. When two or more agents are combined, they may be selected from the same type of flame retardant (metal hydroxide, for example), or different types of flame retardants (metal hydroxide and phosphorus compound, for example) may be combined.

Among those flame retardants, it is especially preferred to combine magnesium hydroxide and red phosphorus, because self-extinguishing properties are enhanced through synergistic effects. The content of magnesium hydroxide is preferred to be 10~50 mass % of the material (composition) for forming an inner coating layer, and the content of red phosphorus is preferred to be 1~10 mass % of the material (composition) for forming the inner coating layer.

(2-2) Outer Coating Layer

When the coating layer of an optical fiber cable according to an embodiment of the present invention is multilayered, an outer coating layer specified below is preferred to be provided on the outer periphery of the above-mentioned inner coating layer.

The material (composition) for forming an outer coating layer contains a polyphenylene ether resin made of polyphenylene ether (hereinafter referred to as "PPE") and a resin compatible with PPE (hereinafter referred to as a "modified PPE resin" when applicable) as the main component. To contain a modified PPE resin as the main component indicates the modified PPE resin is contained at 50 mass % or greater of the material (composition) for forming an outer coating layer.

PPE exhibits flame retardancy derived from the resin itself; however, it is difficult to use it alone since its molding temperature is significantly high and fluidity of the resin is low. Thus, to increase the fluidity and to lower the molding temperature of a PPE, a resin compatible with PPE is mixed in. The resin to be added is preferred to exhibit high compatibility with PPE and a higher fluidity than that of the PPE.

(2-2-1) Polyphenylene Ether (PPE)

When the coating layer of an optical fiber cable according to an embodiment of the present invention is multilayered, any known PPE is used for the material of the outer coating layer.

Examples of PPE to be used in the material for forming the outer coating layer are poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene) ether, poly(2-ethyl-6-propyl-1,4-phenylene)ether, poly(2,6-dimethoxy-1,4-phenylene)ether, poly(2,6-diphenyl-1,4-phenylene)ether, poly(2,6-ditolyl-1,4-phenylene)ether, poly (2,6-dibenzyl-1,4-phenylene)ether, poly(2,5-dimethyl-1,4-phenylene)ether or the like. Among the above, poly(2,6-dimethyl-1,4-phenylene)ether is preferred because its generic types are easy to obtain.

(2-2-2) Resin Compatible with PPE

A resin compatible with PPE is not limited specifically, as long as it is compatible with a PPE to form a modified PPE that exhibits desired molding temperature and fluidity. Because of especially excellent compatibility, polystyrenes such as styrene resins and styrene-based thermoplastic elastomers are preferred.

Styrene resins are homopolymers of styrene compounds or copolymers containing a styrene compound and a monomer copolymerizable with the styrene compound. Examples of a styrene compound are styrenes and alkyl-substituted styrenes such as α-methyl styrene, α-ethyl styrene, α-methyl-p-methylstyrene, o-methyl styrene, m-methyl styrene, and p-methylstyrene. Among them, styrenes and α-methyl styrenes are preferred.

Examples of a styrene-based thermoplastic elastomer are polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-poly(ethylene-butylene)-polystyrene, polystyrene-(ethylene-butylene/styrene copolymer)-polystyrene, polystyrene-polyisoprene-polystyrene, and poly(α-methyl styrene)-polybutadiene-poly(α-methylstyrene), or styrene block copolymers such as those obtained by selectively hydrogenating the above styrene.

When PPE and a resin compatible with PPE are mixed, the ratio to mix the resin compatible with PPE is preferred to be 20~100 parts by mass to 100 parts by mass of PPE. The mixing ratio of a resin compatible with PPE is more preferred to be 35~95 parts by mass, even more preferred to be 50~90 parts by mass, to 100 parts by mass of PPE. When the mixing ratio of a resin compatible with PPE is set at 20 parts by mass or greater to 100 parts by mass of PPE, the melting viscosity of the modified PPE resin is sufficiently lowered, and more proper flexibility is obtained when an optical fiber cable, especially, a POF cable, is produced. Also, by setting the amount of a resin compatible with PPE at no greater than 100 parts by mass to 100 parts by mass of PPE, the optical fiber cable is more easily carbonized during combustion, while it is suppressed from dripping.

Moreover, the above modified PPE resins may contain auxiliaries such as a compatibilizer. As for a compatibilizer, polyamide resins and polyolefin resins may be used. The amount of an auxiliary is not limited specifically, as long as the effect from the added auxiliary is obtained while desired properties of the modified PPE resin are not impaired. The amount is selected properly according to the components or the like of the modified PPE resin.

Commercially available modified PPE resins may be used for the optical fiber cable of an embodiment of the present invention. Examples of commercially available modified PPE resins are NORYL™ series made by SABIC, IUPI-ACE™ made by Mitsubishi Engineering Plastics Corporation and the like.

(2-3) Flame Retardant

In the embodiments of the present invention, coating layers are preferred to contain halogen-free flame retardant (C) to provide sufficient flame retardancy to the optical fiber cable. When the coating layer is multilayered, at least the outer coating layer (containing a modified PPE resin as its main component) is preferred to contain a flame retardant. Halogen-free flame retardant (C) is preferred to be made of at least metal hydroxide (C1) or phosphorus compound (C2).

The flame retardant to be used in the embodiments of the present invention is especially preferred to be made of phosphorus compound (C2). By using phosphorus compound (C2), the coating layer is more easily carbonized during combustion of optical fiber cables, and dripping of the POF itself is significantly suppressed when the POF is used as optical fiber.

Such phosphorus compound (C2) is preferred to be at least one selected from red phosphorus, phosphoric ester compounds (such as aromatic phosphoric acid ester compounds), condensed phosphoric ester compounds, phosphate compounds (such as aromatic phosphate compounds), condensed phosphate compounds, phosphoric amide compounds, and condensed phosphoric amide compounds. More preferably, phosphorus compound (C2) is at least one selected from red phosphorus, phosphoric ester compounds (such as aromatic phosphoric ester compounds), condensed phosphoric ester compounds, phosphate compounds (such as aromatic phosphate compounds), and condensed phosphate compounds. Phosphorus compound (C2) may be used alone or in combination thereof.

To use in optical fiber cables where the coating layer is multilayered and the outer coating layer is formed by using a modified PPE resin, among the above phosphorus compounds, phosphoric ester compounds are especially preferred because of their excellent compatibility with modified PPE resins.

Specific examples of phosphorus compound (C2) are red phosphorus and those listed below.

Examples of a phosphoric ester compound are aromatic phosphoric ester compounds such as triphenyl phosphate, tricresyl phosphate, trixylenyl phosphate, cresyl diphenyl phosphate, and 2-ethylhexyl diphenyl phosphate.

Examples of a condensed phosphoric ester compound are aromatic condensed phosphoric ester compounds such as resorcinol bis-diphenyl phosphate, resorcinol bis-dixylenyl phosphate, bisphenol A bis-diphenyl phosphate.

Commercially available phosphorus-based flame retardants may also be used for phosphorus compound (C2). Commercially available phosphorus-based flame retardants are, for example, phosphoric ester-based flame retardants, REOFOS series (brand name), made by Ajinomoto Fine Techno Co., Inc.; halogen-free phosphoric ester-based flame retardants made by Daihachi Chemical Industry Co., Ltd.; red phosphorus-based flame retardant, NOVA pellets (brand name), made by Rin Kagaku Kogyo Co., Ltd.; inorganic phosphorus-based flame retardants, TAIEN series (brand name), made by Taihei Chemical Industrial Co., Ltd. and the like.

Other phosphorus-based flame retardants are nitrogen-containing phosphates such as ammonium phosphate, melamine phosphate, guanylurea phosphate, melamine pyrophosphate, and piperazine pyrophosphate; nitrogen-containing condensed phosphates such as ammonium polyphosphate, and melamine polyphosphate; phosphorus-nitrogen-containing compounds such as inorganic phosphorus-based or organic phosphorus-based compounds, for example, phosphoric amide, and condensed phosphoric amide; mixtures of phosphorus compounds and nitrogen compounds; or compounds in combination of the above.

The flame retardants above are referred to as intumescent flame retardants. They are flame-retardant mixtures; for example, a compound containing both a phosphorus component to promote carbonization and a nitrogen component to promote fire extinguishing and foaming in the same compound, or a mixture obtained by combining a phosphorus-containing compound and a nitrogen-containing compound.

Commercially available intumescent flame retardants may also be used; examples are ADK STAB FP-2100J (brand name, made by ADEKA Corporation), ADK STAB FPP-2200S (brand name, made by ADEKA), APINON-405 (brand name, made by Sanwa Chemical Co., Ltd.), MPP-B (brand name, made by Sanwa Chemical), PHOSMEL-200 (brand name, made by Nissan Chemical Industries, Ltd.), Fire Cut FCP-770 (brand name, made by Suzuhiro Chemical Co., Ltd.), STABIACE SCFR-110 (brand name, made by Sakai Chemical Industry Co., Ltd.), STABIACE SCFR-200 (brand name, made by Sakai Chemical Industry) and the like.

Also, metal hydroxide (C1) may be used as halogen-free flame retardant (C). Examples of metal hydroxide (C1) are magnesium hydroxide and aluminum hydroxide. Hydroxyl groups in the molecule of metal hydroxide (C1) decompose during combustion and release water, thereby enhancing the self-extinguishing properties of the coating layer.

Examples of magnesium hydroxide are commercially available products such as KISUMA series (brand name, Kyowa Chemical Industry Co., Ltd.) and MAGSEEDS series (brand name, made by Konoshima Chemical Co., Ltd.).

In addition, nitrogen compounds (nitrogen-based flame retardants) may also be used as halogen-free flame retardant (C). Nitrogen-based flame retardants are capable of enhancing self-extinguishing properties of coating resins during combustion.

Melamine compounds, triazine compounds, urea compounds, guanidine compounds and tetrazole compounds, for example, are used for nitrogen-based flame retardants.

Examples of melamine compounds are those having a melamine skeleton, for example, melamine; melamine derivatives such as melam, melem and melon, which are melamine condensates; melamine cyanurate, which is a salt of melamine and cyanuric acid; melamine sulfates; and mixtures of melamine and melamine cyanurate.

Examples of triazine compounds are those having a triazine skeleton such as acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, and mixtures of two or more of the above.

Examples of urea compounds are those having a urea skeleton and their salts, such as guanylurea phosphates.

Examples of guanidine compounds are those having a guanidine skeleton and their salts, such as guanidine sulfamates and guanidine phosphates.

Examples of tetrazole compounds are those having a tetrazole skeleton, such as metal salts or amine salts of tetrazole compounds. In particular, 5,5'-bi-1H-tetrazole.diammonium, 5,5'-bi-1H-tetrazole.piperazine, 5,5'-bi-1H-tetrazole.diguanidine, and barium, calcium, potassium, lithium, zinc or sodium salts of bistetrazole.

The nitrogen-based flame retardants above may be used alone or in combination thereof.

Among the nitrogen-based flame retardants listed above, melamine compounds are preferred. Examples of melamine-based flame retardants using melamine compounds are melamine cyanurates, melamine sulfates and their salts, mixtures of melamine and melamine cyanurate and the like. Commercially available melamine-based flame retardants are, for example, STABIACE MC-2010N (brand name, made by Sakai Chemical Industry), MELAPUR MC25 (brand name, made by BASF), MELAPUR 200/70 (brand name, made by BASF), APINON-901 (brand name, made by Sanwa Chemical) and the like. Since those nitrogen-based flame retardants generate inert gas when decomposed during combustion, they are capable of enhancing flame retardancy (self-extinguishing properties).

The content of phosphorus compound (C2) is preferred to be 5~50 mass %, more preferably 7~40 mass %, even more preferably 10~30 mass %, of the material (composition) for forming a coating layer (the single layer when a coating layer is single-layered; the outer coating layer when a coating layer is multilayered). By setting the content of phosphorus compound (C2) at 5 mass % or greater, sufficient flame retardant properties are provided for the coating layer. However, if the content of phosphorus compound (C2) is set greater than 50 mass %, hardly any significant increase in the effects is observed.

The content of metal hydroxide (C1) is preferred to be 15~50 mass %, more preferably 20~48 mass %, even more preferably 20~40 mass %, of the material (composition) for forming a coating layer (the single layer when a coating layer is single-layered; the outer coating layer when a coating layer is multilayered). By setting the content of metal hydroxide (C1) at 15 mass % or greater, sufficient flame retardant properties are provided for the coating layer. However, if the content of metal hydroxide (C1) is set greater than 50 mass %, hardly any significant increase in the effects is observed.

The content of a nitrogen-based flame retardant is preferred to be 10~50 mass %, more preferably 15~45 mass %, even more preferably 20~40 mass %, of the material (composition) for forming a coating layer (the single layer when a coating layer is single-layered; the outer coating layer when a coating layer is multilayered). By setting the content of a nitrogen-based flame retardant at 10 mass % or greater, sufficient flame retardant properties are provided for the coating layer. However, if the content of a nitrogen-based flame retardant is set greater than 50 mass %, hardly any significant increase in the effects is observed.

Resin compositions obtained by mixing polyolefin resin (A) and halogen-free flame retardant (C) are commercially available; examples are OLEFISTA™ series (made by Mitsubishi Chemical Corporation) and NUC™ series (made by NUC Corporation).

Flame-retardant promoters may be added to the coating layer to further enhance flame retardant effects.

Examples of a flame retardant promoter are metal hydroxides such as magnesium hydroxide and aluminum hydroxide; silicon-based compounds; and inorganic substances such as talc, zinc oxide, titanium oxide and zinc borate.

Zinc borate is especially preferred, since it is capable of promoting the formation of a carbonized layer, suppressing smoke, preventing dripping and the like during combustion. Commercially available zinc borate products are, for example, ADK STAB 2335 (brand name, made by ADEKA).

The content of a flame retardant promoter is not limited specifically as long as it does not impair the desired properties. The content is preferred to be 0~10 mass %, more preferably 0.3~8 mass %, even more preferably 0.5~5 mass %, of the material (composition) for forming a coating layer (the single layer when a coating layer is single-layered; the outer coating layer when a coating layer is multilayered). By setting the content of a flame retardant promoter at 0.5 mass % or greater, even higher flame retardant effects are achieved. However, if the content of a flame retardant promoter is set greater than 5 mass %, hardly any significant increase in the effects is observed.

The total content of a flame retardant and a flame retardant promoter is not limited specifically as long as it does not impair the desired properties. The content is preferred to be 5~60 mass %, more preferably 7~50 mass %, even more preferably 10~40 mass %, of the material (composition) for forming a coating layer (the single layer when a coating layer is single-layered; the outer coating layer when a coating layer is multilayered). By setting the total content of a flame retardant and a flame retardant promoter at 5 mass % or greater, sufficient flame retardancy is provided for the coating layer. However, if the total content of a flame retardant and a flame retardant promoter is set greater than 60 mass %, hardly any significant increase in the effects is observed.

(2-4) Other Additives (pigments, etc.)

In the embodiments of the present invention, to enhance the identification or design features of an optical fiber cable, various pigments may be added to the coating layer within a range that does not impair the properties of the optical fiber cable. When the coating layer is multilayered, pigments are preferred to be provided at least to the outer coating layer. Known types selected from inorganic and organic pigments are available.

Examples of pigments are white pigments such as titanium dioxide and zinc oxide; yellow pigments such as azo organic pigment, lead yellow, chrome yellow, and zinc yellow; blue pigments such as ultramarine (ultramarine blue) and cobalt blue; green pigments such as chromium oxide and cobalt green; and the like.

Among those, titanium dioxide and zinc oxide, especially, titanium dioxide, are preferred for a white pigment; ultramarine blue is preferred for a blue pigment; and chromium oxide is preferred for a green pigment, considering contrast ratios and coloring capability.

The content of a pigment in the coating layer is not limited specifically, but it is preferred to be 0.5~10 mass %, more preferably 1~7 mass %, even more preferably 3~5 mass %, of the material (composition) for forming a coating layer (the single layer when a coating layer is single-layered; the outer coating layer when a coating layer is multilayered). By setting the content of a pigment at 0.5 mass % or greater, sufficient coloring effects are achieved. By setting the content of a pigment at 10 mass % or less, the mechanical strength of an optical fiber cable is prevented from decreasing, while the optical characteristics are prevented from experiencing a decrease caused by pigment migration into the optical fiber.

(2~5) Thickness of Coating Layer

The thickness of an inner coating layer is not limited specifically, and is properly determined according to the usage purposes of the optical fiber cable. The thickness of an inner coating layer may be set at 60~300 µm, for example, preferably at 75~270 µm, more preferably at 100~250 µm.

By setting the thickness of the inner coating layer at 60 µm or greater, even better effects are obtained for suppressing the optical characteristics of a POF from experiencing a decrease caused by migration of a flame retardant or the like into the POF from the outer coating layer as described later. However, if the thickness of an inner coating layer is increased beyond 300 µm, hardly any significant improvement is observed in the effects derived from the thickness.

The thickness of an outer coating layer is not limited specifically, and is properly determined according to usage purposes of the optical fiber cable. The thickness of an outer coating layer may be set at 300~540 µm, for example, preferably at 330~525 µm, more preferably at 350~500 µm.

By setting the thickness of the outer coating layer at 300 µm or greater, it is easier to provide sufficient flame retardancy for the POF cable, and flame retardancy is enhanced to a degree that passes the VW-1 flame test. However, even if the thickness of an outer coating layer is increased beyond 540 µm, hardly any significant improvement is observed in the effects derived from the thickness.

The total thickness of a coating layer including the inner coating layer and the outer coating layer (the thickness of the single layer when a coating layer is single-layered) is properly selected according to usage purposes or the like of the optical fiber cable. The total thickness of the coating layer is set at 360~840 µm, for example, preferably 405~795 µm, more preferably 450~750 µm. By setting the total thickness of a coating layer at 360 µm or greater, it is easier to provide sufficient flame retardancy for the POF cable, and flame retardancy is enhanced to a degree that passes the VW-1 flame test. However, even if the total thickness of a coating layer is increased beyond 840 µm, hardly any significant improvement is observed in the effects derived from the thickness.

When the outer diameter of an optical fiber cable according to an embodiment of the present invention is set at a generally used size of 2.2 mm, for example, and when the outer diameter of a POF is set the same as that of a generic POF at 1.0 mm, then the total thickness of a coating layer is set at 0.6 mm.

When a coating layer is multilayered, from the viewpoint of securing sufficient retardancy, the inner and outer coating layers are preferred to have a thickness ratio in a range of 50:50 (for example, 300 µm: the inner coating layer, 300 µm: outer coating layer) to 10:90 (for example, 60 µm: inner coating layer, 540 µm: outer coating layer); preferably in a range of 40:60 (for example, 240 µm: inner coating layer, 360 µm: outer coating layer) to 15:85 (for example, 90 µm: inner coating layer, 510 µm: outer coating layer); even more preferably in a range of 30:70 (for example, 180 µm: inner coating layer, 420 µm: outer coating layer) to 20:80 (for example, 120 µm: inner coating layer, 480 µm: outer coating layer).

An optical fiber cable having a multilayer coating layer according to an embodiment of the present invention uses a combination of an inner coating layer containing polyolefin resin (A) as its main component and an outer coating layer containing a modified PPE resin as its main component. Thus, the optical fiber cable exhibits excellent flame retardancy and mechanical characteristics, where transmission loss is sufficiently suppressed even when a phosphorus compound is contained as a flame retardant in the outer coating layer.

(2-6) Producing Optical Fiber Cable

The optical fiber cable according to an embodiment of the present invention is formed by employing generally known methods. An example of a method for forming a coating layer around the outer periphery of an optical fiber, for example, is an extrusion coating method using a known apparatus such as a crosshead-type coating apparatus equipped with an extruder. When a coating layer is multi-layered having two or more layers, one layer at a time may be formed, or multiple layers may be formed simultaneously.

When a POF is used as the optical fiber, the temperature of an extruder is preferred to be set at 170~250° C., more preferably 180~240° C., even more preferably 190~230° C.

By setting the temperature of an extruder at 170° C. or higher, the coating material is homogenously melted, and extrusion stability is well maintained. By setting the temperature of the extruder at 250° C. or lower, deterioration of additives such as a coloring pigment or a flame retardant is prevented so as not to cause discoloration or coloration.

In addition, the temperature of a crosshead die is preferred to be 180~240° C., more preferably 190~230° C., even more preferably 195~225° C. By setting the temperature of a crosshead die at 190° C. or higher, roughened surfaces of coating layers are prevented, resulting in an excellent exterior appearance of optical fiber cables. By setting the temperature of a crosshead die at 240° C. or lower, thermal deterioration is prevented so as not to cause a decrease in the properties when a POF is used as optical fiber.

EXAMPLES

In the following, the optical fiber cable according to an embodiment of the present invention is further described by referring to examples.

The examples below are evaluated by the methods as follows.

Transmission Loss

A 25 m-5 m cutback technique was employed to determine transmission loss (dB/km): a wavelength of light to be measured: 650 nm, and the NA (numerical aperture) of incident light: 0.1.

Long-Term Heat Resistance Test

Test A (Long-Term Heat Resistance Test)

After the initial transmission loss of an optical fiber cable was measured, the optical fiber cable was placed in a chamber that was set at a constant temperature of 85° C. (relative humidity of 10% or lower). Then, transmission loss was measured after the optical fiber cable was kept under conditions of temperature at 85° C. for 3000 hours (condition A).

Tests B and C (Long-Term Heat Resistance Tests)

After the initial transmission loss of an optical fiber cable was measured, the optical fiber cable was placed in a chamber set under hot, wet conditions of a constant temperature at 75° C. and relative humidity at 95%. Then, transmission loss was measured after the optical fiber cable was kept for 1000 hours (condition B) and 3000 hours (condition C) respectively.

Flame Retardancy Test (Flammability Test)

Flame retardancy testing was conducted in compliance with VW-1 (vertical wire flame test) specified in UL 1581. A 15-second flame test was conducted 5 times. The POF was indicated to have passed the test if no spread of fire caused by the dripping from the burnt material was observed on the surgical cotton placed underneath; or even when a sample (a POF cable) caught fire, if the fire went out within 60 seconds. Out of 10 tests, the number with a passing result is shown as the test results.

Mechanical Characteristics Test (1) Number of Repeated Bendings

Testing was conducted in compliance with JIS C6861. A sample was attached to a testing machine for repeated bending tests, and was bent to either side at an angle of 90 degrees relative to a vertical direction while a load was applied corresponding to a weight of 500 g (it is counted as one bending when the sample is bent to both sides and returned to the original position). The testing was repeated until an increase of 1 dB from the initial value was observed in transmission loss. The number of bendings at that time is shown as the test results (the number of repeated bendings).

(2) Anti-Shock Strength

Testing was conducted in compliance with JIS C6861. A test sample was placed on a flat steel plate, and a weight of 1 kg was dropped from a predetermined height to exert impact on the sample and the steel plate. Then, the potential energy of the weight at that time was determined. The testing was repeated until an increase of 1 dB from the initial value was observed in transmission loss. The potential energy at that time is shown as the test result (shock resistance strength).

Example 1

A POF with a core/cladding structure shown below (outer diameter of 1.0 mm) was used as the optical fiber.

Core: polymethyl methacrylate (PMMA);

First cladding (cladding positioned on the outer periphery of the core): copolymer of 2,2,2-trifluoroethyl methacrylate (3FM)/2-(perfluorooctyl)ethyl methacrylate (17FM)/methyl methacrylate/methacrylic acid (at a mass ratio of 51/31/17/1);

Second cladding (second cladding positioned on the outer periphery of first cladding): copolymer of vinylidene fluoride/tetrafluoroethylene/hexafluoropropylene (refractive index 1.374).

Next, a composition for coating layers was prepared as follows.

A composition for forming a coating layer was mixed and kneaded as follows: 100 parts by mass of a resin composition containing polyethylene and a phosphate-based flame retardant (brand name OLEFISTA QU1548N4, made by Mitsubishi Chemical), 5 parts by mass of acrylic resin as a melt tension enhancer (METABLEN P-1050, made by Mitsubishi Rayon), and 1 part by mass of zinc borate (ADK STAB 2335, made by ADEKA) as a flame retardant promoter.

The composition for coating was coated on the outer periphery of the POF using a crosshead-type coating apparatus (temperature of the crosshead die: 180° C.) to obtain a POF cable with an outer diameter of 2.2 mm.

Long-term heat resistance and flame retardancy tests were conducted on the POF cable. The results are shown in Table 1.

Example 2

A POF cable was formed the same as in Example 1 except that the resin composition for preparing a coating composition was replaced with a resin composition containing polyethylene and magnesium hydroxide as a flame retardant (brand name: OLEFISTA QU1541H2, made by Mitsubishi Chemical). Long-term heat resistance and flame retardancy tests were conducted on the POF cable. The results are shown in Table 1.

Example 3

A POF cable was formed the same as in Example 1 except that the resin composition for preparing a coating composition was replaced with a resin composition containing polyethylene and magnesium hydroxide as a flame retardant (brand name: OLEFISTA QU1541H2, made by Mitsubishi Chemical), and that a flame retardant promoter (zinc borate) was not added. Long-term heat resistance and flame retardancy tests were conducted on the POF cable. The results are shown in Table 1.

Example 4

A POF cable was formed the same as in Example 1 except that the coating composition did not contain a flame retardant promoter (zinc borate). Long-term heat resistance and flame retardancy tests were conducted on the POF cable. The results are shown in Table 1.

Example 5

A POF cable was formed the same as in Example 1 except that the resin composition for preparing a coating composition was replaced with a resin composition containing EEA (ethylene-ethyl acrylate copolymer) and magnesium hydroxide as a flame retardant (brand name: NUC-9793, made by NUC Corp.). Long-term heat resistance and flame retardancy tests were conducted on the POF cable. The results are shown in Table 1.

Example 6

A POF cable was formed the same as in Example 1 except that the resin composition for preparing a coating composition was replaced with a resin composition containing ethylene-ethyl acrylate (EEA) copolymer and magnesium hydroxide as a flame retardant (brand name: NUC-9793, made by NUC Corp.), and that a flame retardant promoter (zinc borate) was not added. Long-term heat resistance and flame retardancy tests were conducted on the POF cable. The results are shown in Table 1.

Comparative Example 1

A POF cable was formed the same as in Example 1 except that the resin composition for preparing a coating composition was replaced with a resin composition containing EEA and magnesium hydroxide and red phosphorus as a flame retardant (brand name: NUC-9739A, made by NUC Corp.), and that neither a melt tension enhancer nor a flame retardant promoter (zinc borate) was added. Long-term heat resistance and flame retardancy tests were conducted on the POF cable. The results are shown in Table 1.

Comparative Example 2

A POF cable was formed the same as in Example 1 except that neither a melt tension enhancer nor a flame retardant promoter (zinc borate) was added to the coating composition. Long-term heat resistance and flame retardancy tests were conducted on the POF cable. The results are shown in Table 1.

Comparative Example 3

A POF cable was formed the same as in Example 1 except that the resin composition for preparing a coating composition was replaced with a resin composition containing polyethylene and magnesium hydroxide as a flame retardant (brand name: OLEFISTA QU1541H2, made by Mitsubishi Chemical), and that neither a melt tension enhancer nor a flame retardant promoter (zinc borate) was added. Long-term heat resistance and flame retardancy tests were conducted on the POF cable. The results are shown in Table 1.

Example 7

Using a crosshead-type coating apparatus, a cable with an outer diameter of 1.5 mm was formed on a POF (outer diameter of 1.0 mm) the same as that in Example 1 by coating the following mixture to form an inner coating layer with a thickness of 250 μm: 100 parts by mass of an ethylene-ethyl acrylate (EEA) copolymer that contains magnesium hydroxide, red phosphorus and carbon black (brand name: NUC-9739A, made by NUC Corp.), and 5 parts by mass of acrylic resin as a melt tension enhancer (brand name: METABLEN P-1050, made by Mitsubishi Rayon). The temperature of the crosshead die was set at 220° C.

Next, the following coating material was coated on the outer periphery of the cable using a crosshead-type cable coating apparatus to form an outer coating layer with a thickness of 350 μm. Accordingly, an optical fiber cable with an outer diameter of 2.2 mm was obtained to have a double-layer coating structure.

Modified PPE resin (brand name: NORYL WCA871A, made by SABIC), a mixture of polyphenylene ether and polystyrene resin containing a phosphoric ester compound as a flame retardant, was used as a coating material for the outer coating layer.

Long-term heat resistance, flame retardancy and mechanical characteristics tests were conducted on the POF cable. The results are shown in Table 2.

Examples 8~13

Each POF cable was prepared the same as in Example 7 except that the materials respectively used for the inner and outer coating layers were those listed in Table 2. Long-term heat resistance, flame retardancy and mechanical characteristics tests were conducted on each POF cable. The results are shown in Table 2.

Comparative Examples 4~9

Each POF cable was prepared the same as in Example 7 except that the materials respectively used for the inner and outer coating layers were those listed in Table 2. Long-term heat resistance, flame retardancy and mechanical characteristics tests were conducted on each POF cable. The results are shown in Table 2.

TABLE 1

| | Coating Layer | | | Long-term Heat Resistance Test | | | Flame Test |
| | Polyolefin Resin (A) type | Melt Tension Enhancer (B) type | Flame Retardant Promoter (D) type | Initial Value (dB/km) | Condition A (dB/km) | Condition C (dB/km) | Number of Passing Times |
|---|---|---|---|---|---|---|---|
| Example 1 | (A-1) | (B-1) | (D-1) | 128 | 131 | 183 | 10 |
| Example 2 | (A-2) | (B-1) | (D-1) | 124 | 130 | 189 | 10 |
| Example 3 | (A-2) | (B-1) | — | 127 | 128 | 166 | 10 |
| Example 4 | (A-1) | (B-1) | — | 131 | 133 | 179 | 10 |
| Example 5 | (A-3) | (B-1) | (D-1) | 128 | 136 | 188 | 10 |
| Example 6 | (A-3) | (B-1) | — | 130 | 133 | 173 | 10 |
| Comparative Example 1 | (A-4) | — | — | 133 | 134 | 171 | 3 |
| Comparative Example 2 | (A-1) | — | — | 128 | 131 | 178 | 6 |
| Comparative Example 3 | (A-2) | — | — | 129 | 136 | 172 | 4 |

(A-1): low-density polyethylene resin composition containing phosphate (brand name: OLEFISTA QU1548N4, made by Mitsubishi Chemical Corp.)
(A-2): low-density polyethylene resin composition containing magnesium hydroxide (brand name: OLEFISTA QU1541H2, made by Mitsubishi Chemical Corp.
(A-3): ethylene-ethyl acrylate copolymer resin composition containing magnesium hydroxide (brand name: NUC-9793, made by NUC Corp.)
(A-4): ethylene-ethyl acrylate copolymer resin composition containing magnesium hydroxide, red phosphorus and carbon black (brand name: NUC-9739A, made by NUC Corp.)
(B-1): acrylic melt tension enhancer (brand name: METABLEN P-1050, made by Mitsubishi Rayon Co., Ltd.)
(D-1): zinc borate (brand name: ADK STAB 2335, made by Adeka Corp.)
Condition A: Exposure for 3000 hours at temperature of 85° C. and relative humidity of 10% or lower
Condition C: Exposure for 3000 hours at temperature of 75° C. and relative humidity of 95%

TABLE 2

| | Inner Coating Layer | | Outer Coating Layer | Long-term Heat Resistance Test | | | | Flame Test | Mechanical Characteristics Test | |
|---|---|---|---|---|---|---|---|---|---|---|
| | Polyolefin Resin (A) type | Melt Tension Enhancer (B) type | Resin type | Initial Value (dB/km) | Condition A (dB/km) | Condition B (dB/km) | Condition C (dB/km) | Number of Passing Times | Repeated Bending Times | Anti-shock Strength (N·m) |
| Example 7 | (A-4) | (B-1) | (A'-1) | 134 | 140 | 193 | 203 | 10 | 11000 | 1.8 |
| Example 8 | (A-5) | (B-1) | (A'-1) | 131 | 138 | 180 | 188 | 10 | 12000 | 1.8 |
| Example 9 | (A-6) | (B-1) | (A'-1) | 138 | 141 | 181 | 189 | 10 | 12000 | 1.8 |
| Example 10 | (A-7) | (B-1) | (A'-4) | 134 | 140 | 191 | 191 | 10 | 15000 | 1.8 |
| Example 11 | (A-4) | (B-1) | (A'-2) | 131 | 141 | 199 | 213 | 9 | 17000 | 2.0 |
| Example 12 | (A-5) | (B-1) | (A'-3) | 130 | 139 | 180 | 198 | 8 | 10500 | 2.0 |
| Example 13 | (A-4) | (B-1) | (A'-2) | 128 | 142 | 186 | 195 | 8 | 10000 | 1.6 |
| Comparative Example 4 | (A'-5) | (B-1) | (A'-1) | 131 | 140 | 317 | 479 | 10 | 12000 | 2.0 |
| Comparative Example 5 | (A'-5) | (B-1) | (A'-2) | 128 | 152 | 376 | 554 | 10 | 18000 | 2.0 |
| Comparative Example 6 | (A'-5) | (B-1) | (A'-3) | 127 | 151 | 202 | 329 | 8 | 11000 | 2.0 |
| Comparative Example 7 | (A'-5) | (B-1) | (A'-6) | 127 | 138 | 167 | 171 | 2 | 43000 | 5.0 |
| Comparative Example 8 | (A'-3) | (B-1) | (A'-3) | 145 | 163 | 381 | 563 | 10 | 20000 | 2.1 |
| Comparative Example 9 | (A'-3) | (B-1) | (A'-2) | 139 | 191 | 552 | 891 | 10 | 25000 | 2.6 |

(A-4): ethylene-ethyl acrylate copolymer resin composition containing magnesium hydroxide, red phosphorus and carbon black (brand name: NUC-9739A, made by NUC Corp.)
(A-5): ethylene-vinyl alcohol copolymer (brand name: EVAL F104B, made by Kuraray Co., Ltd.)
(A-6): low-density polyethylene resin (brand name: NOVATEC LD400, made by Japan Polyethylene Corp.)
(A-7): linear low-density polyethylene resin (brand name: DFDG-6059, made by the Dow Chemical Company)
(A'-1): modified PPE resin containing a phosphoric ester compound (brand name: NORYL WCA871A, made by SABIC)
(A'-2): modified PPE resin containing a phosphoric ester compound (brand name: NORYL WCA105, made by SABIC)
(A'-3): modified PPE resin containing a phosphoric ester compound (brand name: NORYL WCD801A, made by SABIC)
(A'-4): modified PPE resin containing a phosphoric ester compound (brand name: NORYL WCD825, made by SABIC)
(A'-5): polyamide 12 resin (brand name: DAIAMID L1640, made by Daicel-Evonik Ltd.)
(A'-6): polyamide 12 resin elastomer (brand name: VESTAMID LX9057, made by Daicel-Evonik Ltd.)
(B-1): acrylic melt tension enhancer (brand name: METABLEN P-1050, made by Mitsubishi Rayon Co., Ltd.)
Condition A: Exposure for 3000 hours at temperature of 85° C. and relative humidity of 10% or lower
Condition B: Exposure for 1000 hours at temperature of 75° C. and relative humidity of 95%
Condition C: Exposure for 3000 hours at temperature of 75° C. and relative humidity of 95%

Abbreviations used in the tables are described below.

(A-1): low-density polyethylene resin composition containing phosphate (brand name: OLEFISTA QU1548N4, made by Mitsubishi Chemical)
(A-2): low-density polyethylene resin composition containing magnesium hydroxide (brand name: OLEFISTA QU1541H2, made by Mitsubishi Chemical)
(A-3): ethylene-ethyl acrylate copolymer resin composition containing magnesium hydroxide (brand name: NUC-9793, made by NUC Corp.)
(A-4): ethylene-ethyl acrylate copolymer resin composition containing magnesium hydroxide, red phosphorus and carbon black (brand name: NUC-9739A, made by NUC Corp.)
(A-5): ethylene-vinyl alcohol copolymer (brand name: EVAL F104B, made by Kuraray Co., Ltd.)
(A-6): low-density polyethylene resin (brand name: NOVATEC LD400, made by Japan Polyethylene Corporation)
(A-7): linear low-density polyethylene resin (brand name: DFDG-6059, made by the Dow Chemical Company)
(A'-1): modified polyphenylene ether resin containing a phosphoric ester compound (brand name: NORYL WCA871A, made by SABIC)
(A'-2): modified polyphenylene ether resin containing a phosphoric ester compound (brand name: NORYL WCA105, made by SABIC)
(A'-3): modified polyphenylene ether resin containing a phosphoric ester compound (brand name: NORYL WCD801A, made by SABIC), further containing a phosphoric ester compound as a flame retardant
(A'-4): modified polyphenylene ether resin containing a phosphoric ester compound (brand name; NORYL WCD825, made by SABIC)
(A'-5): polyamide 12 resin (brand name: DAIAMID L1640, made by Daicel-Evonik Ltd.)
(A'-6): polyamide 12 resin elastomer containing melamine cyanurate (brand name: VESTAMID LX9057, made by Daicel-Evonik)
(B-1): acrylic melt tension enhancer (brand name: METABLEN P-1050, made by Mitsubishi Rayon)
(D-1): zinc borate (brand name: ADK STAB 2335, made by ADEKA) Condition A: Exposure for 3000 hours at temperature of 85° C. and relative humidity of 10% or lower
Condition B: Exposure for 1000 hours at temperature of 75° C. and relative humidity of 95%
Condition C: Exposure for 3000 hours at temperature of 75° C. and relative humidity of 95%

As shown in Table 1, the POF cables of Examples 1~6 showed sufficient long-term heat resistance (indicating that an increase in transmission loss was well suppressed), and excellent flame retardancy in flame retardancy testing conducted in compliance with the VW-1 flame test.

By contrast, the POF cables of Comparative Examples 1~3 prepared without containing a melt tension enhancer in the coating layer showed sufficient long-term heat resistance, but failed to show sufficient flame retardancy in flame retardancy testing conducted in compliance with the VW-1 flame test.

As shown in Table 2, POF cables in Examples 7~13 showed sufficient mechanical strength, and exhibited sufficient flame retardancy in flame retardancy testing conducted in compliance with the VW-1 flame test. Moreover, it was found that an increase in transmission loss was well suppressed in the POF cables of Examples 7~13 even after they underwent hot, wet treatments in long-term heat resistance testing.

On the other hand, the POF cables of Comparative Examples 4~6, where the inner coating layer was formed by using material containing PA12 resin and a melt tension enhancer and the outer coating layer was formed by using a modified polyphenylene ether resin containing a phosphoric ester compound, exhibited excellent flame retardancy and mechanical characteristics, but transmission loss was significantly increased when they underwent hot, wet treatments in long-term heat resistance testing. That was thought to be because the phosphoric ester as a flame retardant in the outer coating layer became phosphoric acid due to hydrolysis reactions under hot, wet conditions, and migrated into the PA12 resin of the inner coating layer and in the POF. Actually, since PA12 resin does not have sufficient chemical resistance to phosphoric acid, it was found that in POF cables that underwent thermal treatment conducted under hot, wet conditions of temperature at 75° C. and relative humidity at 95% for 3000 hours, PA12 resin of the inner coating layer had deteriorated and was significantly fragile.

Also, the POF cable of Comparative Example 7, where the inner coating layer was formed by using material that contains PA12 resin and a melt tension enhancer and the outer coating layer was formed by using a polyamide 12 elastomer containing melamine cyanurate as a flame retardant, showed excellent mechanical characteristics and long-term heat resistance, but did not show sufficient flame retardancy in flame retardancy testing conducted in compliance with the VW-1 flame test.

The POF cables of Comparative Examples 8 and 9, where the inner coating layer was formed by using a material that contains a modified polyphenylene ether resin containing a phosphoric ester compound and a melt tension enhancer and the outer coating layer was formed by using a modified polyphenylene ether resin containing a phosphoric ester compound, showed excellent flame retardancy and mechanical characteristics, but transmission loss was significantly increased after hot, wet treatments in the long-term heat resistance testing. That was thought to be because the phosphoric ester as a flame retardant in the inner and outer coating layers turned into phosphoric acid due to hydrolysis reactions under hot, wet conditions, and migrated into the POF.

What is claimed is:

1. An optical fiber cable, comprising:
   an optical fiber; and
   a coating layer comprising at least one layer provided on the outer periphery of the optical fiber,
   wherein the material for forming the coating layer comprises a halogen-free resin composition containing a polyolefin resin (A) and a melt tension enhancer (B), where the melt tension enhancer (B) is able to provide melt tension for the polyolefin resin (A), and the melt tension enhancer (B) comprises an acrylic resin with a weight-average molecular weight of 1,000,000 to 6,000,000.

2. The optical fiber cable according to claim 1, wherein the polyolefin resin (A) comprises at least one resin material selected from polyethylene, polypropylene, ethylene-alkylacrylate copolymers and ethylene-vinyl alcohol copolymers.

3. The optical fiber cable according to claim 1, wherein the polyolefin resin (A) is present at 70 to 99 mass % and the melt tension enhancer (B) is present at 1 to 30 mass % based on the total mass of the polyolefin resin (A) and the melt tension enhancer (B).

4. The optical fiber cable according to claim 1, wherein the material for forming the coating layer further contains a halogen-free flame retardant (C).

5. The optical fiber cable according to claim 4, wherein the halogen-free flame retardant (C) comprises at least one material selected from a metal hydroxide (C1) and a phosphorus compound (C2).

6. The optical fiber cable according to claim 5, wherein the phosphorus compound (C2) comprises at least one compound selected from red phosphorus, phosphoric ester compounds, condensed phosphoric ester compounds, phosphate compounds, condensed phosphate compounds, phosphoric amide compounds, and condensed phosphoric amide compounds.

7. The optical fiber cable according to claim 4, wherein the polyolefin resin (A) is present at 39 to 94 mass %, the melt tension enhancer (B) is present at 1 to 30 mass % and the halogen-free flame retardant (C) is present at 5-60 mass %, based on the total mass of the polyolefin resin (A), the melt tension enhancer (B) and the halogen-free flame retardant (C).

8. The optical fiber cable according to claim 1, wherein the coating layer comprises at least an inner coating layer provided on the outer periphery of the optical fiber and an outer coating layer provided on the outer periphery of the inner coating layer,
   the material for forming the inner coating layer comprises a halogen-free resin composition containing the polyolefin resin (A) and the melt tension enhancer (B), and
   the material for forming the outer coating layer comprises a composition containing polyphenylene ether resin.

9. The optical fiber cable according to claim 8, wherein the polyphenylene ether resin is an alloy resin of polyphenylene ether and polystyrene.

10. The optical fiber cable according to claim 9, wherein the polystyrene is a styrene-based elastomer.

11. The optical fiber cable according to claim 8, wherein the polyphenylene ether resin is an alloy resin that contains polyphenylene ether at 50 to 80 mass %.

12. The optical fiber cable according to claim 1, wherein the optical fiber is a plastic optical fiber.

* * * * *